(No Model.) 2 Sheets—Sheet 1.

A. H. MOSES.
ROTARY ENGINE.

No. 532,476. Patented Jan. 15, 1895.

WITNESSES:

Alfred H Moses INVENTOR

BY

ATTORNEY (No Model.) 2 Sheets—Sheet 2.

A. H. MOSES.
ROTARY ENGINE.

No. 532,476. Patented Jan. 15, 1895.

WITNESSES:
INVENTOR
Alfred H Moses
BY
ATTORNEY

UNITED STATES PATENT OFFICE.

ALFRED H. MOSES, OF SEBEWAING, MICHIGAN, ASSIGNOR OF ONE-HALF TO FRED A. LUCKHARD, OF SAME PLACE.

ROTARY ENGINE.

SPECIFICATION forming part of Letters Patent No. 532,476, dated January 15, 1895.

Application filed September 4, 1894. Serial No. 522,028. (No model.)

*To all whom it may concern:*

Be it known that I, ALFRED H. MOSES, a citizen of the United States, residing at Sebewaing, in the county of Huron and State of Michigan, have invented a certain new and useful Rotary Engine; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a rotary engine and consists in the peculiar construction, arrangement and combination shown and described.

Figure 1:
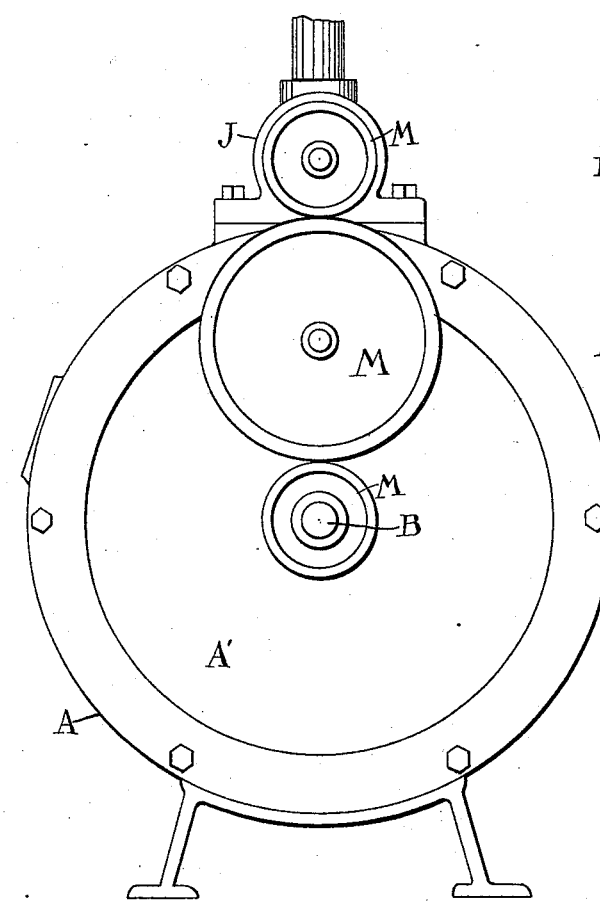
Figure 2:
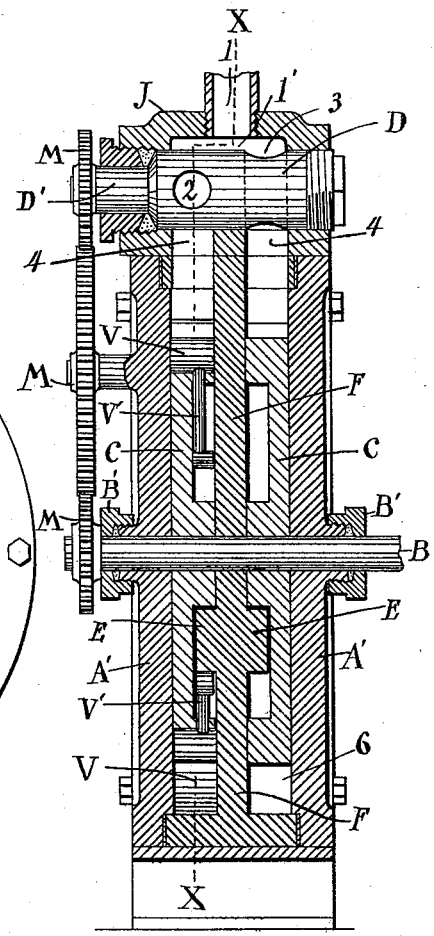
Figure 3:
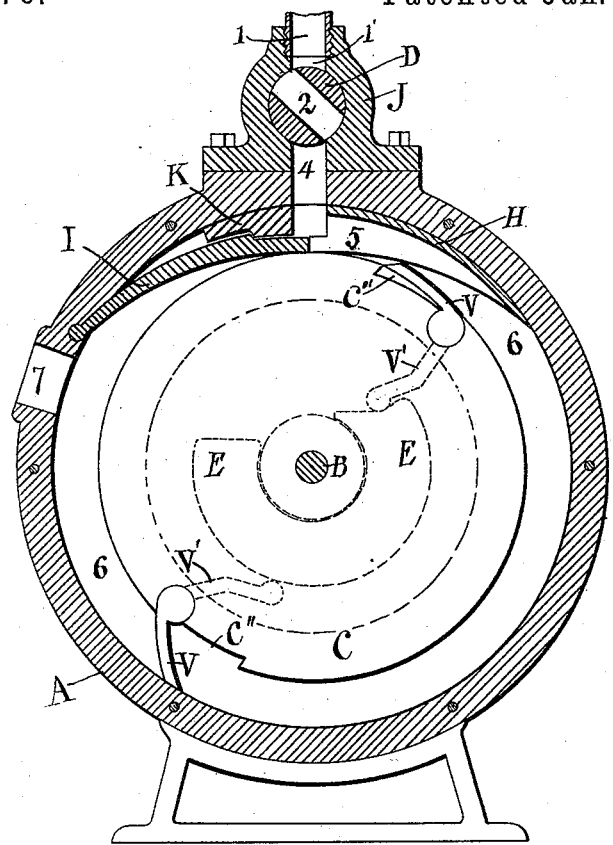
Figure 4:
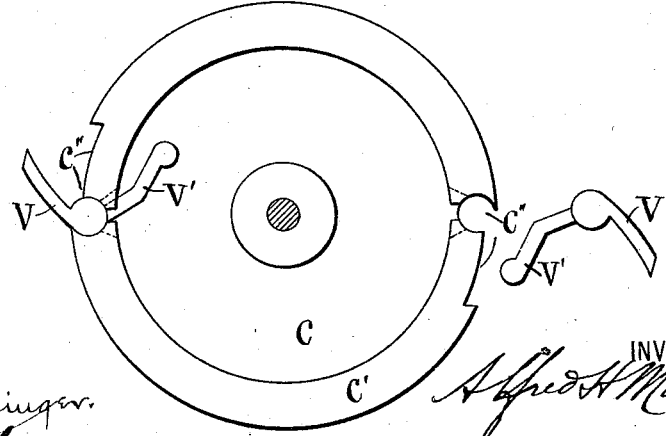

Figure 1 is an end elevation of the engine. Fig. 2 is a vertical transverse section. Fig. 3 is an end view with the head removed, and part sectional on line $x$—$x$ of Fig. 2, valve D being closed. Fig. 4 is a detail of the piston mechanism.

In the drawings, A is the steam chest in which is located the rotary wheel C provided with the wing pistons V, V.

A' is the head of the chest.

B is a shaft passing through the chest A and carries the wheel C within the chest and may carry any number of pulleys or gearing outside the chest, and to these pulleys or gearing the machinery to be propelled is attached. The shaft B when passing through the chest has the usual packed boxes B'. The rear wall, F, of the chest has an eccentric lug E extending into the the chamber 6 around the shaft B. It is the peculiar peripherical form of the lug that operates and controls the wing piston V hereinafter described.

C is a wheel within the chest A on the shaft B of smaller diameter than the chest and carries two or more wing pistons V. These wings are journaled within the periphery of the wheel C'', and when closed the outer surface of the wings complete the periphery of the wheel. These wings are provided with the arm V' extending toward the center of the wheel and engage the periphery of the eccentric lug E which either opens the wing or allows it to be closed. These wings V are of sufficient size to close the space between the inner circumference of the chest and the outer periphery of the wheel, which space constitutes the steam chamber 6.

1, 4 and 5 are the ports for live steam.

7 is the exhaust port.

H is a guide having the port 5 through it. The object of this guide is to regulate the opening of the wing V after passing the steam port 4, the wing having been closed, as will hereinafter appear, before passing that port. This guide H at the opening of the port 4 extends across the steam chamber 6 to the surface of the wheel C and from that point slopes in the direction in which the wheel moves and in the curve described by the wing as it is opened by the lug E. The port 5 through this guide gives the steam to the wing as it opens. On the other side of the port 4 opposite the guide H is the guide I and block K which effectually prevent the steam from the port 4 passing on that side of the wheel. The guide I is hinged to the inside of the chest with its loose end projecting just beyond the edge of the port 4, the steam thereby holding it to the periphery of the wheel C. This guide I is solid but is of the same form as the guide H and crosses the steam chamber in the same curve thereby closing the wing V as it is revolved by it. It is obvious that as these wings are equi-distant on the surface of the wheel C after one has taken steam the other will take steam before the first has passed the exhaust port 7. After passing the exhaust port the wing is closed by the guide I, the form of the eccentric lug E permitting it, until past the live steam port 4 when it is again opened by the surface of the lug E engaging the arm V', and given steam gradually by the guide H.

It will be observed that my engine is so constructed that all wear will be taken up automatically. As the ends of the wings wear they will be further opened by the pressure from the steam. As the guide I wears on the periphery of the wheel C it will be taken up in the same way. It may be observed that the centrifugal force would open the wings. Yet it is not always certain, but by employing the eccentric lug E and arm V' the wing must fly open at the right time.

The inner surface of the wheel C is provided with a rim C' of the thickness of the eccentric lug E, the rim closing the space between the inner wall and the wheel. A circumferential groove may be turned on both surfaces of the wheel and filled with packing to prevent steam getting in the chamber around the eccentric lug. As previously stated, one or more of these wheels may be used, each having a chamber independent of the others, but so set that they will take steam alternately. (In the drawings I have illustrated a duplex rotary engine, i. e., one with two wheels.) For this purpose I have described the cut-off valve D which consists of a solid cylinder provided with ports, 2, 3, according to the number of wheels used. These ports are at right angles to each other and directly over ports 4, 4, of the respective wheels, and are simply a square mortise through the cylinder. This cylinder is placed in a tight boxing J secured to the chest A above the port 4 and has a central port 1. The cylinder entirely fills the boxing except a small chamber l' at the mouth of the port 1 which connects the port 1 to the ports 2 and 3. The cylinder has its bearing in this boxing J, but one end of the cylinder is provided with a shaft D' which projects through the boxing and carries a gear wheel M, meshing into gearing from the central shaft B. These two shafts B and D' are so geared together that the cylinder D will revolve at the same time and the same number of times and in the same direction as the wheel C. The direction, however, of the cylinder revolutions is immaterial, the object being to have an open port through the cylinder when each wing V passes by the guide H.

Having thus described my invention, what I claim as new, and desire to secure by Letters Patent, is—

1. In a rotary engine, the combination with the steam chest having a central shaft, a wheel within the chest upon the shaft, and smaller than the inner diameter of the chest, and wings on the periphery of the wheel journaled below the periphery thereof and adapted when open to close the channel or space between the inner wall of the chest and the wheel, a live steam port entering the chest, a guide within the chest upon one side of the steam port containing a channel for the steam, the sides of the channel extending to the edge of the wheel and from that point sloping toward the wall of the chest, whereby the wings will open and take steam gradually, a guide upon the opposite side of the steam port having one end thereof pivoted in the wall of the chest, the other end extending to the wheel and bearing thereon, at the mouth of the steam port, a lug closing the space between this guide and the wall of the cylinder at the steam port and an exhaust port in the rear of the pivoted guide, substantially as and for the purpose set forth.

2. In a rotary engine, a steam chest having upon the top thereof a live steam port 4 connected with the cut-off valve D, the lug K and guide I closing the channel upon one side of the live port upon the wheel and the steam chest, guide I being pivoted in the wall of the steam chest just above the exhaust port and extending beyond the lug K closing the channel to the live steam port, whereby the pressure of the steam will cause the guide to bear upon the wheel, the guide H, extending from the mouth of the live steam port partway around the chest and having a channel 5 formed by the edges of the guide extending to the wheel at the opening of the steam port and sloping from that point to the wall of the steam chest, whereby the wings on the wheel will open, and take steam, gradually and be closed gradually by the guide I after passing exhaust port 7, and the exhaust port 7, as and for the purpose set forth.

3. In a rotary engine, the combination with a cylinder having two steam chambers, a central shaft through the chambers, a wheel within each chamber on the central shaft, the wheel carrying winged valves journaled in its periphery, the valves adapted to close the channel between the wheel and the inner wall of the cylinder, arms on the wings extending toward the center of the wheel, of an eccentric lug in each chamber and surrounding the shaft and adapted to engage the arm of the wing and to close or open it at the proper time, live steam ports entering each chamber at the same point in the cylinder, a cut off valve located across the entrance of these steam ports, the cut off valve consisting of a solid cylinder having two right angle mortises, each mortise being over the opening to the steam ports, the solid cylinder being in a tight casing having an inlet port, the casing having a small steam cavity at the mouth of its inlet port extending from one mortise to the other, means without the cylinder for revolving the cut off valve and the central shaft of the cylinder at the same speed, and means within the steam chambers for directing the steam around the wheel in one direction, and an exhaust port, and means for closing the wings of the wheel after passing the exhaust port, as and for the purpose set forth.

In testimony whereof I affix my signature in presence of two witnesses.

ALFRED H. MOSES.

Witnesses:
A. H. SWARTHOUT,
FRED A. LUCKHARD.